Apr. 3, 1923.
H. EUMMELEN
1,450,494
WATERING TROUGH
Filed Feb. 26, 1921
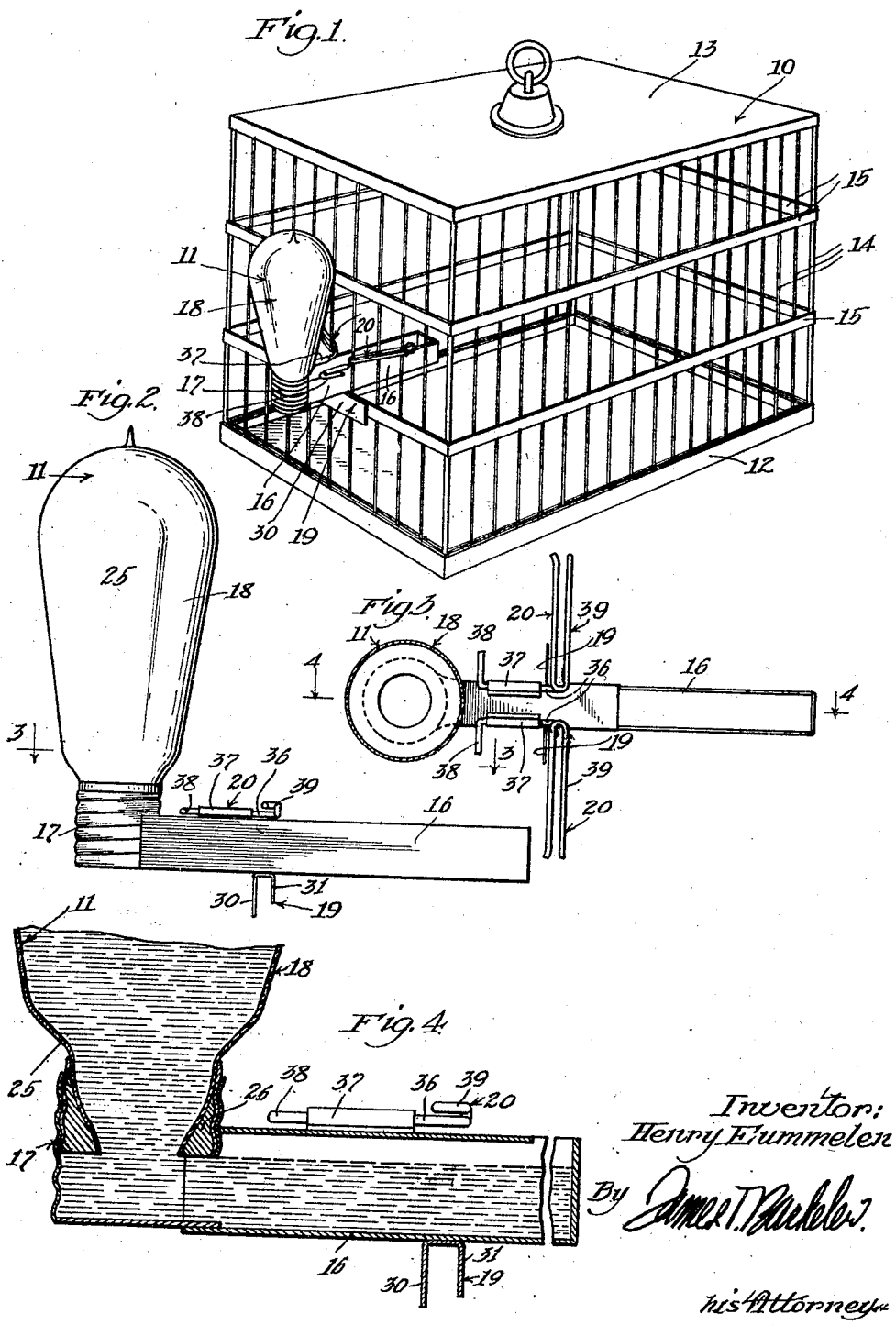
Inventor:
Henry Eummelen
By James T. Bachelor.
his Attorney Patented Apr. 3, 1923.

1,450,494

UNITED STATES PATENT OFFICE.

HENRY EUMMELEN, OF SANTA ANA, CALIFORNIA.

WATERING TROUGH.

Application filed February 26, 1921. Serial No. 448,163.

*To all whom it may concern:*

Be it known that I, HENRY EUMMELEN, a citizen of the United States, residing in Santa Ana, county of Orange, State of California, have invented new and useful Improvements in Watering Troughs, of which the following is a specification.

This invention relates to a watering trough for use in connection with cages, such for instances as bird cages, etc. An object of the invention is to provide a simple effective and easily handled device of that character.

A particular object of the invention is to provide a watering trough which can be handled, that is placed in and withdrawn from a cage, with ease and without spilling or wasting water. Conservation of all of the water for use makes it necessary to give the device only a minimum amount of attention and keeps the cage as neat and clean as possible.

A noteworthy feature of the invention is the means provided for securing the trough in place in the cage. The trough is firmly held in a horizontal position between the bars of the cage and can only be withdrawn therefrom upon releasement of the securing or retaining means. When the securing means is released the trough can be very easily placed between and removed from the bars of the cage without manipulating or turning it in any way.

Another important feature is the general construction and simplicity of the device. The device is neat and sightly in construction and can be simply and inexpensively manufactured.

The various objects and features of my invention will be best and more fully understood from the following detailed description of a typical preferred form of my invention throughout which reference is had to the accompanying drawings in which—

Fig. 1 is a perspective view of a typical bird cage with the device of the present invention in operative position in it; Fig. 2 is an enlarged side elevation of the device of the present invention removed from the cage; Fig. 3 is a plan section of the device taken as indicated by line 3—3 on Fig. 2; and Fig. 4 is an enlarged detailed vertical section through the device being a view taken as indicated by line 4—4 on Fig. 3.

Throughout the drawings numeral 10 designates a typical bird cage and numeral 11 designates the watering device provided by the present invention. I herein specify and describe a bird cage merely for the purpose of facilitating a clear understanding of the present invention it being understood, of course, that the invention is not in any way limited or restricted to use in connection with any particular kind of cage and that the present disclosure is merely typical and for purpose of illustration. The cage 10 shown in the drawings is of usual construction comprising a bottom 12, a top 13, vertical bars 14 extending between the edges of the bottom 12 and top 13 supporting the top 13 on the bottom 12, and horizontal bars 15 arranged intermediate the top 13 and bottom 12 and connecting the vertical bars 14. The vertical bars 14 are preferably wire, or the like, and are spaced apart as far as possible without being far enough apart to allow the bird to escape or pass between them. It will be understood, of course, that the spacing of the bars 14 will depend very much upon the size of the bird or animal to be kept in the cage.

The device 11 provided by the present invention comprises, generally, a horizontally disposed trough 16, a socket 17, at the outer end of the trough 16, a water carrier or reservoir 18 mounted in the socket 17, a supporting bracket 19 at the bottom of the trough 16, and a pair of supporting brackets 20 at the top of the trough 15. The trough 16 is comparatively long and narrow being sufficiently narrow to pass between the bars 14. The top of the inner end portion of the trough 16, that is that portion of the trough which extends into the cage, is open, while the outer end portion of the trough which extends outwardly from the cage is completely closed. I prefer that the trough be substantially square in cross sectional configuration although I do not wish to limit or restrict the invention to any particular form of trough as it is obvious how the trough may be of any desired cross sectional configuration.

The socket 17 is at the extreme outer end of the trough 16 and is arranged to face upwardly in the manner clearly shown throughout the drawings. The socket 17 may be formed independently of the trough 16 and thereafter be secured to the trough in any convenient manner, say, for instance, by welding or soldering.

The water carrier or reservoir 18 preferably comprises a bowl part 25 opening downwardly, and a base 26 secured to the lower part of the bowl 25. The base 26 is adapted to cooperate with or seat in the socket 17 in the manner clearly shown in Fig. 4 of the drawings. In practice I have found it convenient to use incandescent light bulbs in forming the reservoir 18 as such devices have the proper kind of glass bowl parts and base parts. However, when light bulbs are used in constructing the device of the present invention an opening must be formed through the base so that the interior of the bowl 25 is in direct communication with the socket 17 and trough 16. In practice the base 26 and socket 17 fit each other more or less accurately so that water, or liquid of any kind, cannot pass between them, and the socket is arranged so that the lower end of the base 26 is somewhat below the top of the trough 16 when it is in operative position, as shown in Fig. 4.

The bracket 19 at the bottom of the trough 16 is U-shaped in cross-sectional configuration and is secured to the bottom of the trough 16 to face downwardly in the manner clearly shown in Figs. 2 and 4 of the drawings. The outer leg 30 of the bracket 19 is comparatively large, or wide, and extends a considerable distance beyond the sides of the trough 16, while the inner leg 31 is comparatively narrow being only as wide as the trough 16. With this construction the trough 16 can be passed between the bars 14 until the inner leg 31 of bracket 19 is within the cage and until the outer leg 30 of the bracket engages the bars 14. The trough can then be lowered until it rests upon one of the horizontal bars 15 causing the inner leg 31 to extend down in back of that rod 15 and the outer leg 30 to extend down in front of that rod 15. The bracket 19 may be advantageously formed of sheet metal and secured to the trough 16 by means of solder, or the like.

The two brackets 20 are mounted on the top of the trough 16 directly above the bracket 19. The two brackets 20 are at opposite sides of the trough and each comprises a shaft part 36 carried in a bearing 37 at the top of the trough 16, a handle 38 at the outer end of the shaft 36, and a U-shaped part 39 at the inner part of the shaft 36. In the preferred form of the invention the shaft 36, handle 38 and part 39 are all formed of a single piece of wire and the bearing 37 is of sheet metal and is soldered or welded to the top of the trough 16. This construction is desirable as it is simple and inexpensive. The U-shaped part 39 is comparatively long as shown in the drawings while the handle part 38 may be comparatively short as it need only be long enough to allow the operator to conveniently grip it. The shaft part 36 is rotatable in the bearing 37 so that the handle and U-shaped part 39 can be turned between a vertical and horizontal position.

In the operation of the device the reservoir 18 is detached from the trough 16 by removing the base 26 from the socket 17. Liquid, usually water, is then filled into the reservoir 18 until it is completely full. With the reservoir and trough in inverted position the base 26 is arranged tightly in the socket 17. The device is then quickly turned to its proper position, as indicated throughout the drawings, allowing part of the liquid from the reservoir 18 to flow into the trough 16. Liquid will fill the trough 16 from the reservoir 18 until the level reaches the bottom of the base 26. With the trough 16 thus filled and the brackets 20 turned to a vertical position the trough is maintained in a horizontal position and its inner end is arranged through, or between, two adjacent bars 14 until the bracket 19 is in position to engage the horizontal rod 15. The device is then lowered until the bracket 19 engages the rod 15 in the manner hereinabove described whereupon the brackets 20 are turned outwardly by means of handles 38 until they engage several of the bars 13. The brackets 20 can be turned to a horizontal position although in practice it is found best to turn them to a position such as is shown in Fig. 1 of the drawings. When I say outwardly, or to a substantially horizontal position, I mean a horizontal position or a position such as is shown in Fig. 1. When the bracket 20 has been turned outwardly the device is secured in position and the trough 16 will remain in horizontal position until the brackets 20 are turned to a vertical position and the device removed in the manner above described. It is obvious that the device is rigidly supported by the cooperation of brackets 19 and brackets 20 and that it can be placed in and removed from a cage without tilting or manipulating the trough 16 in such manner as to spill any of the liquid from it. When the trough is arranged in the cage in the manner hereinabove described the liquid may be used from it. The level of liquid will always remain even with the bottom of the base 26 as long as there is liquid in the reservoir 18. When the level of liquid lowers the slightest amount away from the bottom of the base 26 air is admitted into the bottom of the bowl 25 and liquid is allowed to flow from the bowl until the level again reaches the bottom of the base 26. The bowl 25 being of glass it is possible to readily see whether or not there is a sufficient supply of liquid in the device.

Although reference is made throughout this disclosure to liquid, and particularly water, being used in the device, it will be obvious how any fluid or material that will flow can be used in the device. For instance, the device can be successfully used as a feed trough to handle seed or other like feed. In practice when this device is to be used to handle feed, say, seed or the like, it may be desirable to vary the design and proportions somewhat from that herein set forth.

Having described only a preferred embodiment of my invention I do not wish to limit myself to the particular details hereinabove set forth but wish to reserve to myself any changes or variations that may appear to those skilled in the art or that may fall within the scope of the following claims.

Having described a preferred form of my invention, I claim:

1. A device adapted to be used in combination with a cage having vertical and horizontal bars, including a water trough adapted to extend inwardly between two vertical bars, a reservoir in connection with the outer portion of the trough, a bracket on the trough to engage a horizontal bar, and a bracket pivotally connected with the trough and adapted to be actuated when the trough is in position between the bars to engage the vertical bars at a point removed from where the first mentioned bracket engages the horizontal bar.

2. A device adapted to be used in combination with a cage having vertical and horizontal bars, including a water trough having an open inner end portion adapted to extend inwardly between two vertical bars, a reservoir at the outer portion of the trough, a bracket at the bottom of the trough adapted to extend downwardly over a horizontal bar, and a bracket at the top of the trough adapted to be arranged in a substantially horizontal position to engage the vertical bars and in a vertical position to allow the trough to be passed between the vertical bars.

3. A device adapted to be used in combination with a cage having vertical and horizontal bars, including a water trough having an open inner end portion adapted to extend inwardly between two vertical bars, a reservoir at the outer portion of the trough, a U-shaped bracket at the bottom of the trough adapted to extend downwardly over a horizontal bar, and a U-shaped bracket at the top of the trough adapted to be arranged in a substantially horizontal position to engage the vertical bars and in a vertical position to allow the trough to be passed between the vertical bars.

4. A device adapted to be used in combination with a cage having vertical and horizontal bars, including a water trough having an open inner end portion adapted to extend inwardly between two vertical bars, a reservoir at the outer portion of the trough, a bracket at the bottom of the trough adapted to extend downwardly over a horizontal bar, and a bracket hinged to the top of the trough adapted to be arranged in a substantially horizontal position to engage the vertical bars and in a vertical position to allow the trough to be passed between the vertical bars.

5. A device adapted to be used in combination with a cage having vertical and horizontal bars, including a water trough having an open inner end portion adapted to extend inwardly between two vertical bars, a reservoir at the outer portion of the trough, a bracket at the bottom of the trough adapted to extend downwardly over a horizontal bar, and U-shaped brackets hinged at opposite sides of the trough adapted to be in vertical positions to allow passage of the trough between the bars and to be in substantially horizontal positions to engage the vertical bars to cooperate with the first mentioned brackets in holding the trough in horizontal position.

6. A device adapted to be used in combination with a cage having vertical and horizontal bars, including a water trough having an open inner portion and a closed outer portion, an upwardly facing socket at the outer portion of the trough, a downwardly opening completely enclosed reservoir carried in the socket, a downwardly facing U-shaped bracket mounted on the bottom of the trough, the inner leg of said bracket being substantially smaller than the outer leg and adapted to pass between the vertical bars so that the bracket will fit over a horizontal bar, U-shaped brackets hinged to opposite sides of the top of the trough adapted to be moved to vertical positions to allow movement of the trough between the vertical bars and to be moved to substantially horizontal positions in opposite directions to each engage a plurality of vertical bars to hold the trough in the cage, and operating handles for said last mentioned brackets at the outer part of the trough.

7. A device adapted to be used in combination with a cage having a plurality of bars, including a water trough adapted to extend into the cage between two bars, a reservoir in connection with the outer portion of the trough, and a bracket in connection with the trough and movable relative to the trough to a position where it engages bars of the cage to retain the trough between said two bars and to a position where it is out of engagement with the bars.

8. A device adapted to be used in combination with a cage having a plurality of bars, including a water trough adapted to extend into the cage between two bars, a reservoir in connection with the outer portion of the trough, and a bracket hinged to the trough so that it can be positioned to allow passage of the trough between the bars and can be positioned to engage bars of the cage to retain the trough between the bars.

9. A device adapted to be used in combination with a cage having a plurality of bars, including a water trough adapted to extend into the cage between two bars, a reservoir in connection with the outer portion of the trough, a bracket on the trough adapted to be actuated to engage bars of the cage to retain the trough between said two bars, and operating handles for said bracket outside of the cage.

10. A device adapted to be used in combination with a cage having a plurality of bars, including a water trough adapted to extend into the cage between two bars, a reservoir in connection with the outer portion of the trough, and a U-shaped bracket mounted on the trough to be movable to a position where it embraces a bar of the cage to retain the trough between said two bars and to a position where it is free of the bars of the cage.

11. A device adapted to be used in combination with a complete cage having a plurality of vertical bars, including a water trough having an open inner portion sufficiently narrow to be freely passed between adjacent bars of the cage in its normal horizontal position, a reservoir in connection with the outer portion of the trough, and a bracket in connection with the trough movable relative to the trough to engage a bar of the cage to retain the trough between the bars.

In witness that I claim the foregoing I have hereunto subscribed my name this 18th day of February 1921.

HENRY EUMMELEN.

Witnesses:
 HELEN KEMMER,
 ALMA SCHROEDER.